(12) United States Patent
Sasaki

(10) Patent No.: US 8,411,205 B2
(45) Date of Patent: Apr. 2, 2013

(54) NOISE REDUCING IMAGE PROCESSING APPARATUS

(75) Inventor: Hiroshi Sasaki, Tokyo (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 13/118,736

(22) Filed: May 31, 2011

(65) Prior Publication Data

US 2011/0228167 A1 Sep. 22, 2011

Related U.S. Application Data

(63) Continuation of application No. PCT/JP2008/072135, filed on Dec. 5, 2008.

(30) Foreign Application Priority Data

Jul. 11, 2007 (JP) .................................. 2007-182199

(51) Int. Cl.
*H04N 5/21* (2006.01)
*H04N 5/14* (2006.01)
(52) U.S. Cl. ........................................ 348/620; 348/701
(58) Field of Classification Search .................. 348/607, 348/699–701, 618–620; 382/274, 275, 269; 345/619
See application file for complete search history.

(56) References Cited

U.S. PATENT DOCUMENTS

| 7,085,318 | B2 * | 8/2006 | Kondo et al. ............ 375/240.01 |
| 7,274,402 | B2 * | 9/2007 | Hahn ............................ 348/441 |
| 7,365,801 | B2 * | 4/2008 | Kondo .......................... 348/620 |
| 7,460,172 | B2 * | 12/2008 | Min ............................... 348/441 |
| 7,535,517 | B2 * | 5/2009 | Zhou et al. .................... 348/701 |
| 2003/0122967 | A1 * | 7/2003 | Kondo et al. ................. 348/607 |

FOREIGN PATENT DOCUMENTS

| JP | 06-062283 | 3/1994 |
| JP | 2004-503960 | 2/2004 |
| JP | 2005-160071 | 6/2005 |
| JP | 2008-205737 | 9/2008 |
| WO | WO 01/97510 | 12/2001 |

OTHER PUBLICATIONS

International Search Report mailed Jan. 13, 2009 in corresponding PCT International Application No. PCT/JP2008/072135.

* cited by examiner

*Primary Examiner* — Victor Kostak
(74) *Attorney, Agent, or Firm* — Ostrolenk Faber LLP

(57) ABSTRACT

An electrical apparatus to reduce noise and minimize a drop in resolution. A recording unit records a processing target frame image and prior and future frame images; a first pixel-extracting section extracts pixels in a prescribed region; a second pixel-extracting section extracts pixels in a region corresponding to the prescribed region in the prior and future frame images; a first distance calculating section calculates temporospatial distances; a second distance calculating section calculates inter-pixel-value distances; and a noise reduction section reduces the processing target frame image on the basis of the temporospatial distance and the inter-pixel-value distance.

14 Claims, 9 Drawing Sheets

NOISE REDUCING IMAGE PROCESSING APPARATUS

CROSS REFERENCE TO RELATED APPLICATIONS

This is a continuation of International Application No. PCT/JP2008/072135, filed Dec. 5, 2008, which is hereby incorporated by reference herein in its entirety. This application is also related to Japanese Patent Application No. 2007-182199, filed Jul. 11, 2007, the content of which is incorporated herein by reference.

BACKGROUND OF THE INVENTION

1. Field of the Invention

The present invention relates to an image processing apparatus that performs noise-reduction processing on video signals, to an image processing method therefor, and to a recording medium for an image processing program.

2. Description of Related Art

In the related art, there have been various proposed methods of noise reduction processing of video signals on which random noise is included, including intra-frame (intra-field) noise-reduction processing using spatial correlation and inter-frame (inter-field) noise-reduction processing using temporal correlation (for example, see Japanese Unexamined Patent Application, Publication No. HEI 6-62283).

BRIEF SUMMARY OF THE INVENTION

The present invention employs the following solutions.

A first aspect of the present invention is an image processing apparatus for noise reduction processing of frame images or field images that are input time-sequentially, including a recording unit configured to record a processing target frame image or field image and previous and future frame images or field images relative to the processing target frame image or field image; a first pixel-extracting section configured to extract a plurality of pixels in a prescribed region in the processing target frame image or field image recorded by the recording unit; a second pixel-extracting section configured to extract a plurality of pixels in a region corresponding to the prescribed region in the previous frame image or field image and in the future frame image or field image recorded by the recording unit; a first distance calculating section configured to calculate temporospatial distances between a target pixel in the prescribed region extracted at the first pixel-extracting section and both the plurality of pixels in the prescribed region and the plurality of pixels in the region corresponding to the prescribed region, extracted at the second pixel-extracting section; a second distance calculating section configured to calculate inter-pixel-value distances between the pixel value of the target pixel in the prescribed region extracted at the first pixel-extracting section and both pixel values of the plurality of pixels in the prescribed region extracted at the first pixel-extracting section and pixel values of the plurality of pixels in the region corresponding to the prescribed region, extracted at the second pixel-extracting section; and a noise reduction section configured to perform noise reduction processing of the processing target frame image or field image on the basis of the temporospatial distance calculated by the first distance calculating section and the inter-pixel-value distance calculated by the second distance calculating section.

According to the first aspect of the present invention, the spatial correlation in a frame and the temporal correlations between the previous frame and the current frame and between the current frame and the future frame are used to perform noise-reduction processing of a video signal. Accordingly, it is possible to suppress an effect whereby the noise-reduction level is sensitive to fluctuations in the temporal correlation, which enables stable noise reduction while inhibiting a drop in resolution.

A second aspect of the present invention is a recording medium in which is recorded an image-processing program causing a computer to execute noise reduction processing of frame images or field images that are input time-sequentially, the program causing a computer to execute: recording processing for recording a processing target frame image or field image and previous and future frame images or field images relative to the processing target frame image or field image; first pixel-extraction processing for extracting a plurality of pixels in a prescribed region in the processing target frame image or field image recorded in the recording processing; second pixel-extraction processing for extracting a plurality of pixels in a region corresponding to the prescribed region in the previous frame image or field image and in the future frame image or field image recorded in the recording processing; first distance calculating processing for calculating temporospatial distances between a target pixel in the prescribed region extracted in the first pixel-extraction processing and both the plurality of pixels in the prescribed region and the plurality of pixels in the region corresponding to the prescribed region, extracted in the second pixel-extraction processing; second distance calculating processing for calculating inter-pixel-value distances between the pixel value of the target pixel in the prescribed region extracted in the first pixel-extraction processing and both pixel values of the plurality of pixels in the prescribed region extracted in the first pixel-extraction processing and pixel values of the plurality of pixels in the region corresponding to the prescribed region, extracted in the second pixel-extraction processing; and noise reduction processing for performing noise reduction processing of the processing target frame image or field image on the basis of the temporospatial distance calculated by the first distance calculating processing and the inter-pixel-value distance calculated by the second distance calculating processing.

A third aspect of the present invention is an image processing method for noise reduction processing of frame images or field images that are input time-sequentially, the image processing method including a recording step of recording a processing target frame image or field image and previous and future frame images or field images relative to the processing target frame image or field image; a first pixel-extraction step of extracting a plurality of pixels in a prescribed region in the processing target frame image or field image recorded in the recording step; a second pixel-extraction step of extracting a plurality of pixels in a region corresponding to the prescribed region in the previous frame image or field image and in the future frame image or field image recorded in the recording processing; a first distance calculating step of calculating temporospatial distances between a target pixel in the prescribed region extracted in the first pixel-extraction step and both the plurality of pixels in the prescribed region and the plurality of pixels in the region corresponding to the prescribed region, extracted in the second pixel-extraction step; a second distance calculating step of calculating inter-pixel-value distances between the pixel value of the target pixel in the prescribed region extracted in the first pixel-extraction step and both pixel values of the plurality of pixels in the prescribed region extracted in the first pixel-extraction step and pixel values of the plurality of pixels in the region corresponding to the prescribed region, extracted in the second pixel-extraction step; and a noise reduction step of performing noise reduction processing of the processing target frame image or field image on the basis of the temporospatial distance calculated in the first distance calculating step and the inter-pixel-value distance calculated in the second distance calculating step.

DETAILED DESCRIPTION OF THE INVENTION

First Embodiment

An image processing apparatus according to a first embodiment of the present invention will be described below with reference to the drawings.

Figure 1:
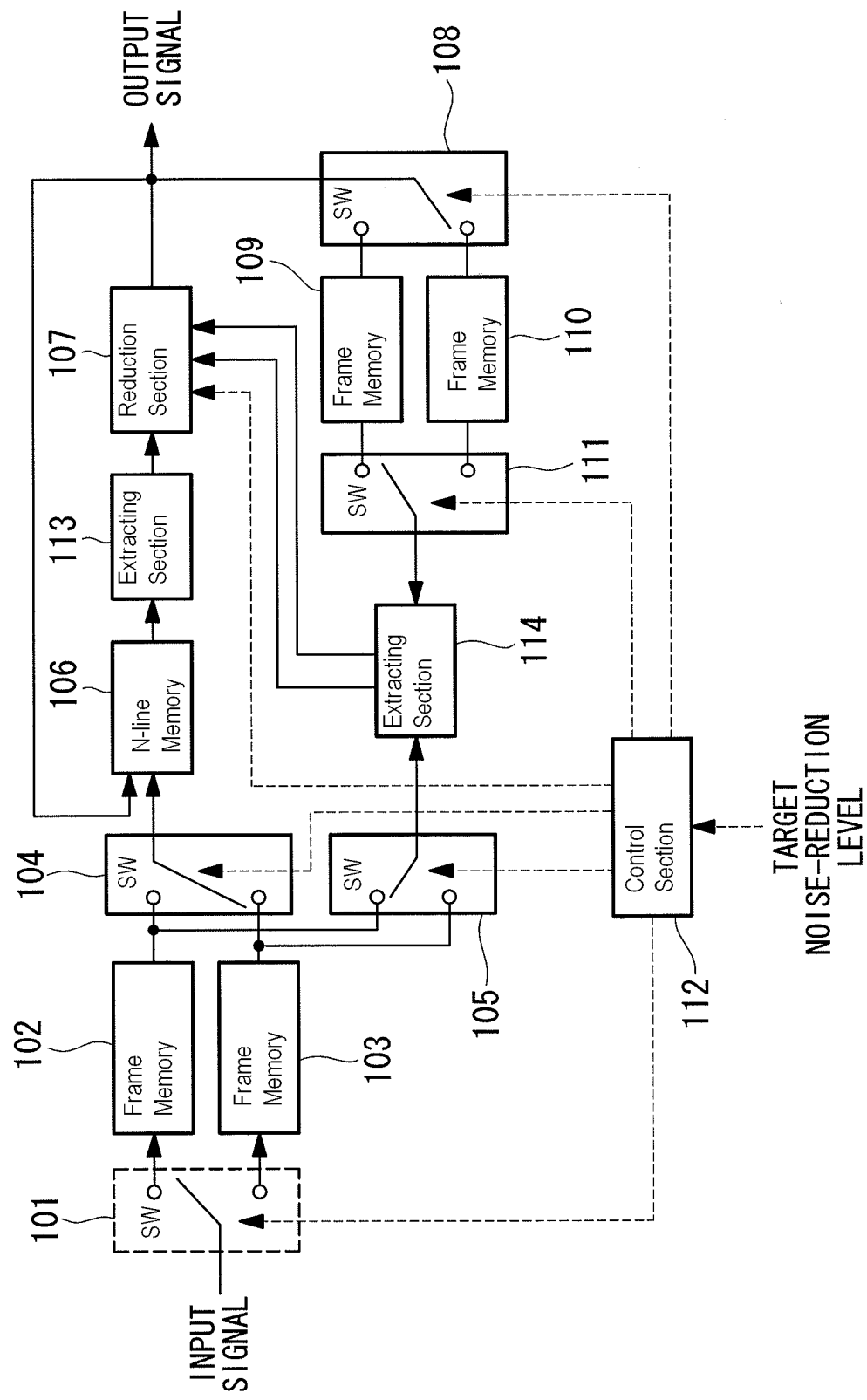
FIG. 1 is a functional block diagram showing, in expanded fashion, the functions provided in an image processing apparatus according to a first embodiment of the present invention.

FIG. 1 is a functional block diagram showing the basic configuration of the first embodiment of the present invention, the details of which are described below.

The image processing apparatus according to this embodiment includes a switch 101; a memory group (recording unit) formed of a frame memory 102, a frame memory 103, a switch 104, a switch 105, a frame memory 109, a frame memory 110, and an N-line memory 106; a noise reduction section 107; a switch 108; a switch 111; a control section 112; a block-extracting section (first pixel-extracting section) 113; and a block-extracting section (second pixel-extracting section) 114.

The flow of signals in the image processing apparatus having the above configuration will be described below.

A video signal captured at an image-capturing device in an image-capturing unit (not illustrated) and converted to a digital signal is input to the switch 101. Here, the switch 101 is alternately connected to the frame memory 102 or the frame memory 103 every frame period based on a control signal from the control section 112. Therefore, the video signal input to the switch 101 is stored in either the frame memory 102 or the frame memory 103 every frame period.

The video signal may be a monochrome signal or a color signal; in the case of a color signal, it may be a synchronized signal formed from multiple colors per pixel (generally three colors), or it may be a signal formed from one color per pixel before synchronization, captured with a single-chip image capturing device. In the following description, although the video signal is described as being a monochromatic signal, in the case of a color signal, it is necessary to perform the processing described below for each color signal.

The frame memory 102 is connected to the switch 104 and the switch 105. The frame memory 103 is also connected to the switch 104 and the switch 105.

The switch 104 and the switch 105 are respectively connected to the N-line memory 106 and the block-extracting section 114. Here, the control section 112 controls the switch 104 and the switch 105 so as to switch the output signals from the switch 104 and the switch 105 every frame period. Specifically, when the frame memory 102 is connected to the N-line memory 106 via the switch 104, the frame memory 103 is connected to the block-extracting section 114 via the switch 105. Conversely, when the frame memory 102 is connected to the block-extracting section 114 via the switch 105, the frame memory 103 is connected to the N-line memory 106 via the switch 104.

Pixels in a prescribed number of lines above and below a target pixel to be subjected to noise-reduction processing are temporarily stored in the N-line memory 106 from the frame memory 102 or the frame memory 103. The N-line memory 106 is connected to the input of the noise-reduction section 107 via the block-extracting section 113.

The block-extracting section 113, the block-extracting section 114, and the control section 112 are connected to the input of the noise reduction section 107. The noise reduction section 107 performs noise-reduction processing on processing target pixels on the basis of a prescribed pixel region in a processing target frame, which is output from the block-extracting section 113; a prescribed pixel region in a temporally future frame image stored in the frame memory 102 or the frame memory 103 and a prescribed pixel region in a temporally previous frame image stored in the frame memory 109 or the frame memory 110, which are both output from the block-extracting section 114; and a control signal from the control section 112. Then, the calculated noise-reduced pixels are output as an output signal. Here, the prescribed regions output from the block-extracting section 113 and the block-extracting section 114 are at spatially identical extraction positions in each frame.

The output of the noise reduction section 107 is also connected to the switch 108 and the N-line memory 106.

The output signal to the N-line memory 106 is used to overwrite the processing target pixels before noise-reduction, which are stored in the N-line memory 106, with the noise-reduced pixels. Accordingly, it becomes possible to form a recursive filter that uses noise-reduced pixels even in the current frame, making it possible to reduce noise even more effectively.

In the switch 108, the connection is switched to either the frame memory 109 or the frame memory 110 every frame period, with a control signal from the control section 112. Accordingly, the noise-reduced pixels calculated in the noise reduction section 107 are recorded in the corresponding frame memory 109 or frame memory 110. Here, the frame memory in which the noise-reduced pixels are recorded is a different frame memory from the frame memory in which the previous frame extracted at the block-extracting section 114 is stored.

The switch 111 is connected to the frame memory 109 and the frame memory 110 in a switching manner every frame period. The control section 112 associates the switch 108 and the switch 111 and controls the switching of each switch. Specifically, when the switch 108 is connected to the frame memory 109, the frame memory 110 is connected to the switch 111. On the other hand, when the switch 108 is connected to the frame memory 110, the frame memory 109 is connected to the switch 111.

The output signal from the switch 111 is input to the block-extracting section 114. At the block-extracting section 114, a plurality of pixels in a peripheral region corresponding to the processing target pixel are extracted.

The control section 112 outputs a target noise-reduction level that is set in advance to the noise reduction section 107, and outputs control signals for interlocked control of the switches 101, 104, 105, 108, and 111 as described above.

Figure 3:
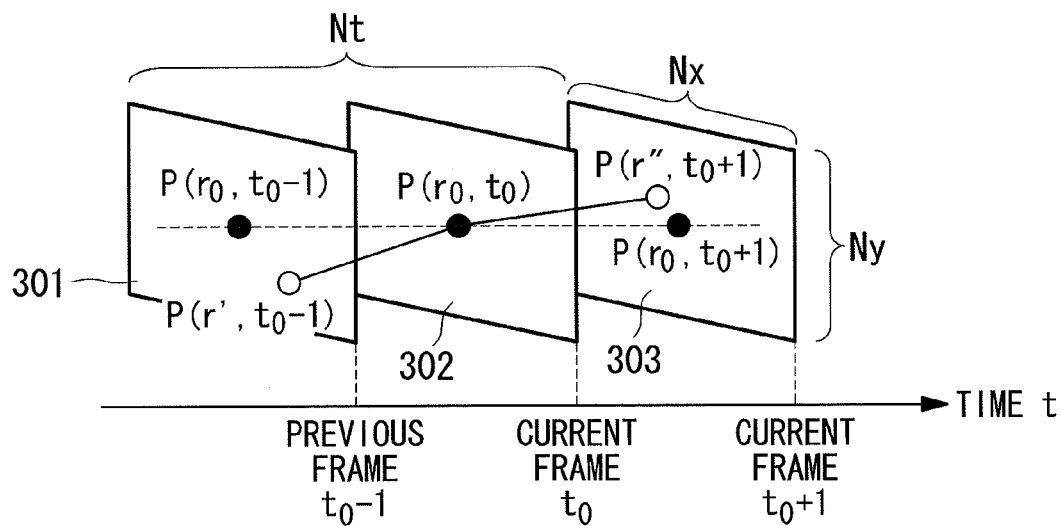
FIG. 3 is a diagram showing a three-dimensional block composed of current, previous, and future blocks processed in the noise reduction section.

FIG. 3 is a schematic diagram showing the structure of a three-dimensional block ($N_x \times N_y \times N_t$ pixels) formed of the processing target pixel to be processed in the noise reduction section 107 and peripheral pixels thereof. In the following, definitions for the three-dimensional block and pixels $P(r, t)$ in that region will be described using FIG. 3.

The three-dimensional block to be processed in the noise reduction section 107 is composed of a current block 302 of $N_x \times N_y$ pixels formed of the processing target pixel $P(r_0, t_0)$ in the current frame (time $t_0$) and pixels $P(r, t_0)$ in the peripheral region thereof; a previous block 301 of $N_x \times N_y$ pixels formed of a pixel $P(r_0, t_0-1)$ in the previous frame (time $t_0-1$) and pixels $P(r, t_0-1)$ in the peripheral region thereof; and a future block 303 of $N_x \times N_y$ pixels formed of a pixel $P(r_0, t_0+1)$ in a future frame (time $t_0+1$) and pixels $P(r, t_0+1)$ in the peripheral region thereof. Here, r means the position vector when the origin in each frame is taken as $r_0$, that is, $r=(x, y)$ and $r_0=(x_0, y_0)$, and the case where $N_t=3$ is shown here, although $N_t$ may be any integer greater than or equal to 2.

When a field interlaced signal is considered, in the previous block and the future block, there are no pixels at the same spatial position as in the current block. However, if $N_x \times N_y$ pixels formed of the processing target pixel $P(r_0, t_0)$ and the pixels $P(r, t_0)$ in the peripheral region thereof are assumed to form the current block, it is possible to define the previous block as $N_x \times N_y$ pixels formed of a pixel $P(r_0', t_0-1)$ in the previous field (time $t_0-1$) and pixels $P(r', t_0-1)$ in the peripheral region thereof and to define the future block as $N_x \times N_y$ pixels formed of a pixel $P(r_0', t_0+1)$ in the future field and pixels $P(r', t_0+1)$ in the peripheral region thereof. In the case of fields, strictly speaking, the current block, the previous block, and the future block are spatially shifted by one line; in the following description, however, a description is given assuming that r=r', that is to say, the same positions.

Figure 2:
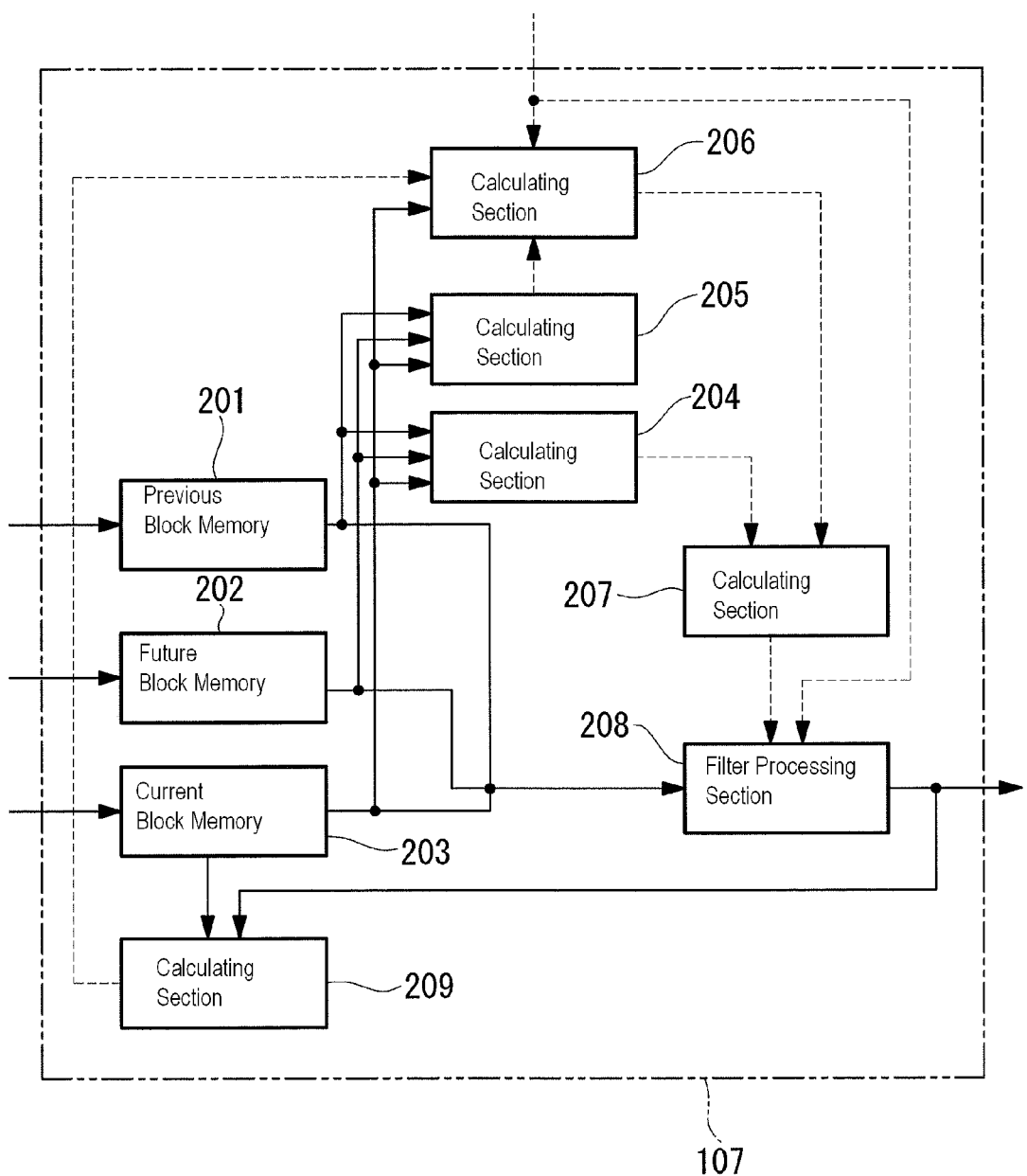
FIG. 2 is a functional block diagram of a noise reduction section in the image processing apparatus in FIG. 1.

FIG. 2 is a detailed block diagram of the noise reduction section 107, and the details thereof will be described based on the above definition of a three-dimensional block.

The noise reduction section 107 includes a previous-block memory 201, a future-block memory 202, a current block memory 203, a distance calculating section (first distance calculating section and second distance calculating section) 204, an inter-frame correlation calculating section (inter-frame correlation-level calculating section) 205, a correction-coefficient calculating section 206, a filter-coefficient calculating section (weighting-coefficient calculating section) 207, a filter processing section (weighted-average calculating section) 208, and a noise-reduction-level calculating section 209.

The flow of signals in the noise reduction section 107 having the above configuration will be described below.

The current block 302 formed of the processing target pixel $P(r_0, t_0)$ and the peripheral region $N_x \times N_y$ thereof is output from the block-extracting section 113 and is stored in the current-block memory 203. The previous block 301 formed of $P(r_0, t_0-1)$, which is at the same spatial position as the processing target pixel $P(r_0, t_0)$, and the peripheral region $N_x \times N_y$ thereof is output from the block-extracting section 114 and is stored in the previous-block memory 201. The future block 303 formed of $P(r_0, t_0+1)$, which is at the same spatial position as the processing target pixel $P(r_0, t_0)$, and the peripheral region $N_x \times N_y$ thereof is output from the block-extracting section 114 and is stored in the future-block memory 202.

The pixel data of the three-dimensional block stored in the three block memories 201, 202, and 203 is output to the distance calculating section 204, the inter-frame correlation calculating section 205, and the filter processing section 208. The pixel data in the current-block memory 203 is further output to the correction-coefficient calculating section 206.

In the distance calculating section 204, a temporospatial distance Ds is calculated as follows from input pixel positions (r, t) stored in the three block memories 201, 202, and 203 and from the position $(r_0, t_0)$ serving as the processing target pixel, recorded in the block memory 203:

for $t \geq t_0$, $Ds = \alpha_1 |t-t_0| + \beta |r-r_0|$ for $t < t_0$, $Ds = \alpha_2 |t-t_0| + \beta |r-r_0|$ Here, $\alpha_1$, $\alpha_2$, and $\beta$ are coefficients greater than or equal to zero that are set in advance, and || indicates absolute value. Also, $|r-r_0| = \sqrt{\{(x-x_0)^2 + (y-y_0)^2\}}$. For calculating the spatial distance $|r-r_0|$, when the block size ($N_x \times N_y$) is set in advance, calculation results can be stored in advance in a ROM table (not shown in the drawings).

$\alpha_1$ indicates a coefficient for transforming time to distance in the future block, and $\alpha_2$ indicates a coefficient for transforming time to distance in the previous block. Here, the previous block is formed of pixels that have already been subjected to noise reduction, and the future block is formed of pixels that have not yet been subjected to noise reduction. Therefore, with regard to the weighting coefficient of each pixel set in the filter calculating section 207, by pre-setting a larger weighting for the previous block compared with the future block, it is possible to improve the noise-reduction effect.

In the distance calculating section 204, an inter-pixel-value distance Dv is calculated based on the following equation from the input pixel value $P(r, t)$ at position (r, t) stored in the three block memories 201, 202, and 203 and from the pixel value $P(r_0, t_0)$ at the target position $(r_0, t_0)$ for noise-reduction processing, recorded in the current-block memory 203:

$Dv = |P(r,t) - P(r_0, t_0)|$

Ds and Dv described above are multiplied in the distance calculating section 204 to calculate a distance $D = Ds \times Dv$ for the processing target pixel $P(r_0, t_0)$ of the pixels $P(r, t)$ in the three-dimensional block, and this is output to the filter-coefficient calculating section 207.

Using the input pixel values $P(r, t)$ of the pixels stored in the three block memories 201, 202, and 203, the inter-frame correlation calculating section 205 calculates an inter-frame correlation value $S_p$ between the current block 302 and the previous block 301 and an inter-frame correlation value $S_f$ between the current block 302 and the future block 303 as follows and outputs them to the correction-coefficient calculating section 206:

$$S_p = \Sigma_r |P(r,t_0-1) - P(r,t_0)|$$

$$S_f = \Sigma_r |P(r,t_0+1) - P(r,t_0)|$$

Here, $\Sigma_r$ indicates the sum over the block $N_x \times N_y$.

The noise-reduction-level calculating section 209, the inter-frame correlation calculating section 205, the control section 112, the current-block memory 203, and the filter-coefficient calculating section 207 are connected to the correction-coefficient calculating section 206. A frame-average noise-reduction level $NR_{ave}$ calculated in the noise-reduction-level calculating section 209, a target noise reduction level $NR_{target}$ output from the control section 112, the correlation value $S_p$ between the current block 302 and the previous block 301, output from the inter-frame correlation calculating section 205, the correlation value $S_f$ between the current block 302 and the future block 303, output from the inter-frame correlation calculating section 205, and the pixel data stored in the current-block memory 203 are input to the correction-coefficient calculating section 206. The correction-coefficient calculating section 206 uses this input data to calculate correction coefficients $T_i$ (here, i=p, c, f) for the filter coefficients calculated in the filter-coefficient calculating section 207.

The correction coefficients $T_i$ are individual coefficients $T_c$, $T_p$, and $T_f$ for the current block 302, the previous block 301, and the future block 303, respectively, and the correction coefficients $T_i$ are output to the filter-coefficient calculating section 207. Here, although a three-dimensional block composed of three frames is illustrated as an example, a three-dimensional block composed of any number of frames N may be used. In this case, N coefficients $T_1$ are calculated and output to the filter-coefficient calculating section 207.

The distance D output from the distance calculating section 204 and the correction coefficients $T_p$, $T_c$, and $T_f$ output from the correction-coefficient calculating section 206 are input to the filter-coefficient calculating section 207. The filter-coefficient calculating section 207 uses this data to calculate filter coefficients $C(r, t)$ corresponding to the pixels $P(r, t)$ stored in the current-block memory 203, the previous-block memory 201, and the future-block memory 202 and outputs them to the filter processing section 208.

The filter processing section 208 reads out the pixels $P(r, t)$ stored in the three block memories 201, 202, and 203 in a predetermined order. Then, it performs a product-sum operation with the read-out pixels $P(r, t)$ and the filter coefficients $C(r, t)$ output from the filter-coefficient calculating section 207 to calculate noise-reduced pixels $P_n(r_0, t_0)$, which are then output.

The noise-reduced pixel $P_n(r_0, t_0)$ calculated in the filter processing section 208 and output therefrom and the processing target pixel $P(r_0, t_0)$ from the current-block memory 203 are input to the noise-reduction-level calculating section 209. The noise-reduction-level calculating section 209 calculates the absolute difference $|P_n(r_0, t_0) - P(r_0, t_0)|$ between the two pixel values and totals these absolute differences for one frame. Then, once the processing for one frame has been completed, it calculates the frame-average noise-reduction level $NR_{ave}$ as follows and outputs it to the correction-coefficient calculating section 206.

$$NR_{ave} = \Sigma_{r0} |P_n(r_0, t_0) - R(r_0, t_0)|/\text{total number of pixels in frame}$$

Here, $NR_{ave}$ in the above example is an average value; however, in an apparatus where the total number of pixels in a frame does not change, the sum of the absolute differences may be used instead.

Figure 6:
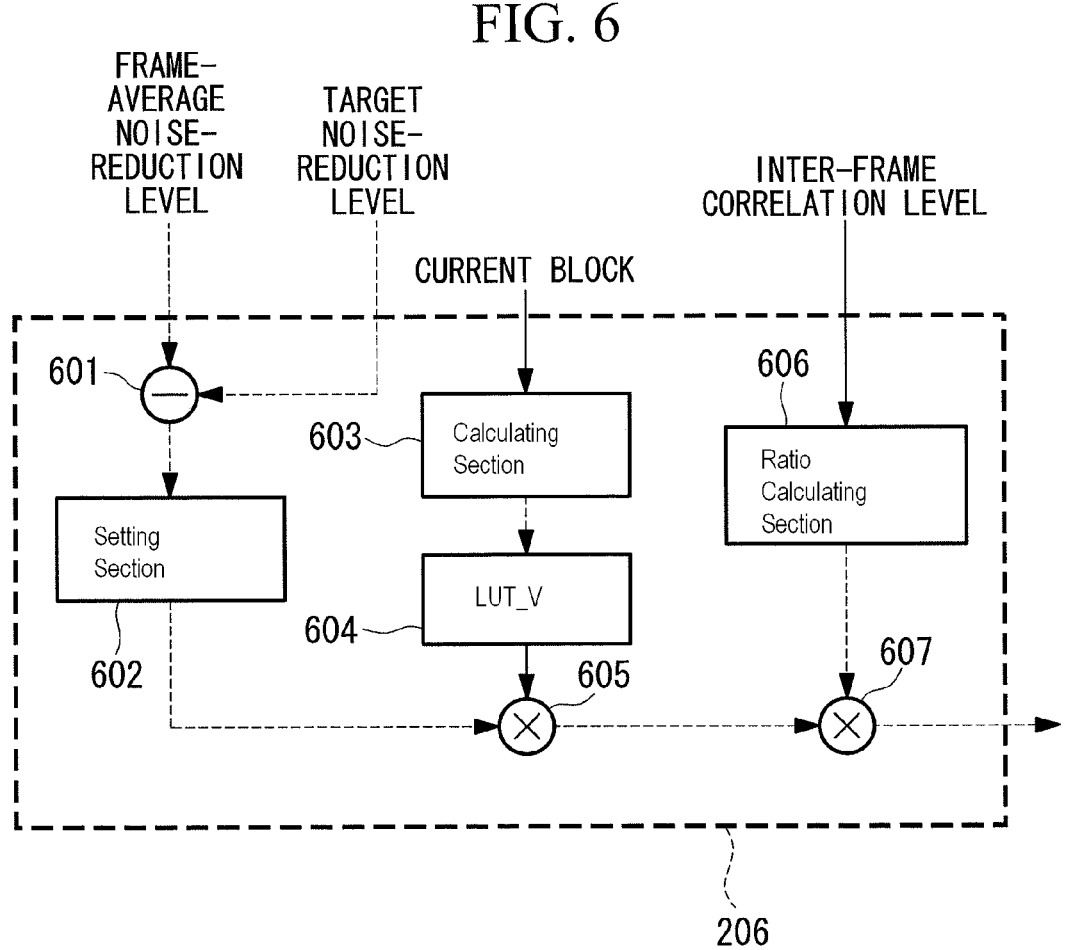
FIG. 6 is a functional block diagram showing a correction-coefficient calculating section shown in FIG. 2.

Details of the correction-coefficient calculating section 206 will be described next on the basis of the functional block diagram in FIG. 6.

In the correction-coefficient calculating section 206, the frame-average noise-reduction level $NR_{ave}$ output from the noise-reduction-level calculating section 209 and the target noise-reduction level $NR_{target}$ output from the control section 112 are input to a subtracter 601. The subtracter 601 subtracts the input values and outputs a reduction error $Er = NR_{ave} - NR_{target}$, which is the value obtained by subtraction, to a reference-correction-coefficient setting section 602.

In the reference-correction-coefficient setting section 602, a reference correction coefficient $T_{base}$ is set on the basis of the input reduction error Er. For example, when TH is a threshold, it is varied in three levels based on the following threshold decision:

if $Er > TH$, reference correction coefficient $T_{base} = V_1$ if $TH \geq Er \geq -TH$, reference correction coefficient $T_{base} = V_2$ if $Er < -TH$, reference correction coefficient $T_{base} = V_3$ Here, $V_1$, $V_2$, and $V_3$ are coefficients set in advance such that $V_1 < V_2 < V_3$.

In other words, the standard reference correction coefficient $V_2$ is output to a multiplier 605 when the absolute value of Er is less than or equal to the threshold TH, the reference correction coefficient $V_1$ that is smaller than the standard is output thereto when Er is greater than the threshold TH, and the reference correction coefficient $V_3$ that is larger than the standard is output thereto when Er is smaller than the negative value of the threshold TH.

On the other hand, the current block 302 output from the current-block memory 203 is input to an average-value calculating section 603. The average-value calculating section 603 calculates an average pixel value of the current block 302 and outputs it to a LUT_V 604. The LUT_V 604 converts the average pixel value to a correction value Rv of the reference correction coefficient for the average pixel value and outputs result to the multiplier 605.

Figure 4:
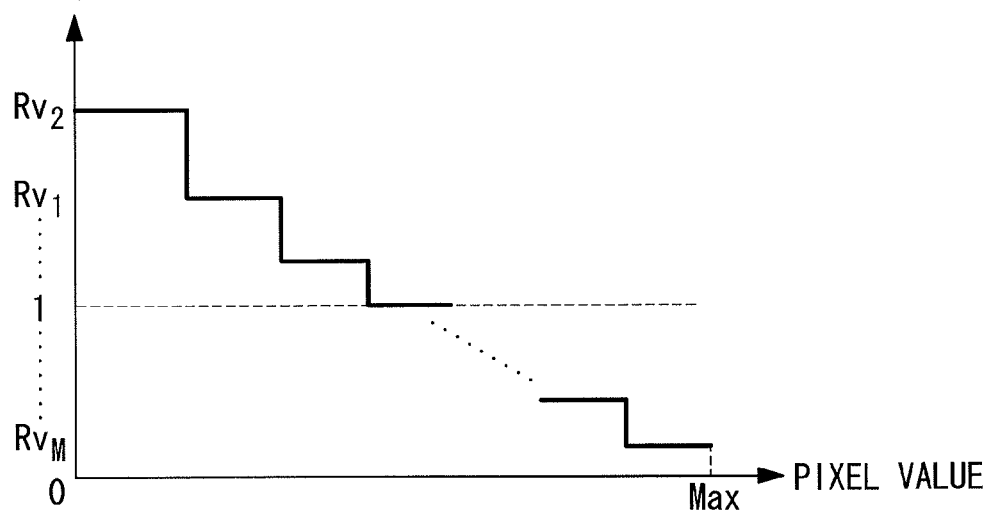
FIG. 4 is a diagram showing an example of the relationship between pixel value and reference-correction-coefficient correction value.

An example of the relationship between the average pixel value and the reference-correction-coefficient correction value Rv is shown in FIG. 4.

In the example in FIG. 4, it is shown that, when the pixel value is small, the reference-correction-coefficient correction value Rv is larger than 1, and as the pixel value increases, the reference correction coefficient correction value Rv becomes less than 1. In other words, in the dark area, making the reference correction coefficient larger achieves a setting where the noise reduction level is emphasized, and conversely, making the reference correction coefficient smaller in the light area achieves a setting where the resolution is emphasized. Note that, they system may be configured with the correction value Rv=1 so that the reference correction coefficient does not depend on the pixel value, regardless of the pixel value.

The multiplier 605 multiplies the reference correction coefficient $T_{base}$ and the correction value Rv described above and outputs the result to a multiplier 607.

On the other hand, the inter-frame correlation value $S_p$ between the previous block 301 and the current block 302 and the inter-frame correlation value $S_f$ between the future block 303 and the current block 302, output from the inter-frame correlation calculating section 205, are input to a correction-coefficient ratio calculating section 606. The correction-coefficient ratio calculating section 606 performs, for example, the following assignments with regard to ratios $R_p$, $R_c$, and $R_f$ for the previous block 301, the current block 302, and the future block 303:

if $S_p \leq TH_p$ and $S_f \leq TH_f$: $R_p = R_c = R_f$ if $S_p \leq TH_p$ and $S_f > TH_f$: $R_p = R_c > R_f$ if $S_p > TH_p$ and $S_f \leq TH_f$: $R_p < R_c = R_f$ if $S_p > TH_p$ and $S_f > TH_f$: $R_p = R_c = R_E$ Here, $R_p + R_c + R_f = 1$.

The condition $S_p \leq TH_p$ and $S_f \leq TH_f$ is for the case where the temporal correlation of both the previous block 301 and the future block 303 with respect to the current block 302 is high, which corresponds to a region where movement, temporally speaking, between the previous and subsequent block regions is small. In this case, the correction coefficients are the same in both the time and space directions.

The condition $S_p \leq TH_p$ and $S_f > TH_f$ is for the case where, with respect to the current block 302, the temporal correlation for the previous block 301 is high and the temporal correlation for the future block 303 is low; this case indicates a region where a sudden movement, or scene change, has occurred during the time between the present and the future. In this case, the correction coefficients for the previous block and the current block are made large, and the correction coefficient for the future block is made small.

The condition $S_p > TH_p$ and $S_f \leq TH_f$ is for the case where, with respect to the current block 302, the temporal correlation for the future block 303 is high and the temporal correlation for the previous block 301 is low; this case indicates a region where a sudden movement, or a scene change, has occurred in the time between the past and the present. In this case, the correction coefficients for the future block 303 and the current block 302 are made large, and the correction coefficient for the previous block 301 is made small.

The condition $S_p > TH_p$ and $S_f > TH_f$ is for the case where the temporal correlations of both the previous block 301 and the future block 303 with respect to the current block 302 are low; this case indicates that there is too much noise in the image or that a movement in the time between the previous block 301 and the future block 303 is large. In this case, the correction coefficients are the same in both the time and space directions.

The multiplier 607 multiplies the output value $T_{base} \times Rv$ from the multiplier 605 with the output values $R_p$, $R_c$, and $R_f$ from the correction-coefficient ratio calculating section 606. The correction coefficients $T_p = T_{base} \times Rv \times R_p$, $T_c = T_{base} \times Rv \times R_c$, and $T_f = T_{base} \times Rv \times R_f$ calculated in this way are output to the filter-coefficient calculating section 207.

Here, an example where the reference correction coefficient, the correction value, and the block assignment ratios are all variably controlled has been illustrated in the above description; however, it is also possible to variably control one or two of these, and to set the others to predetermined constants.

Figure 7:
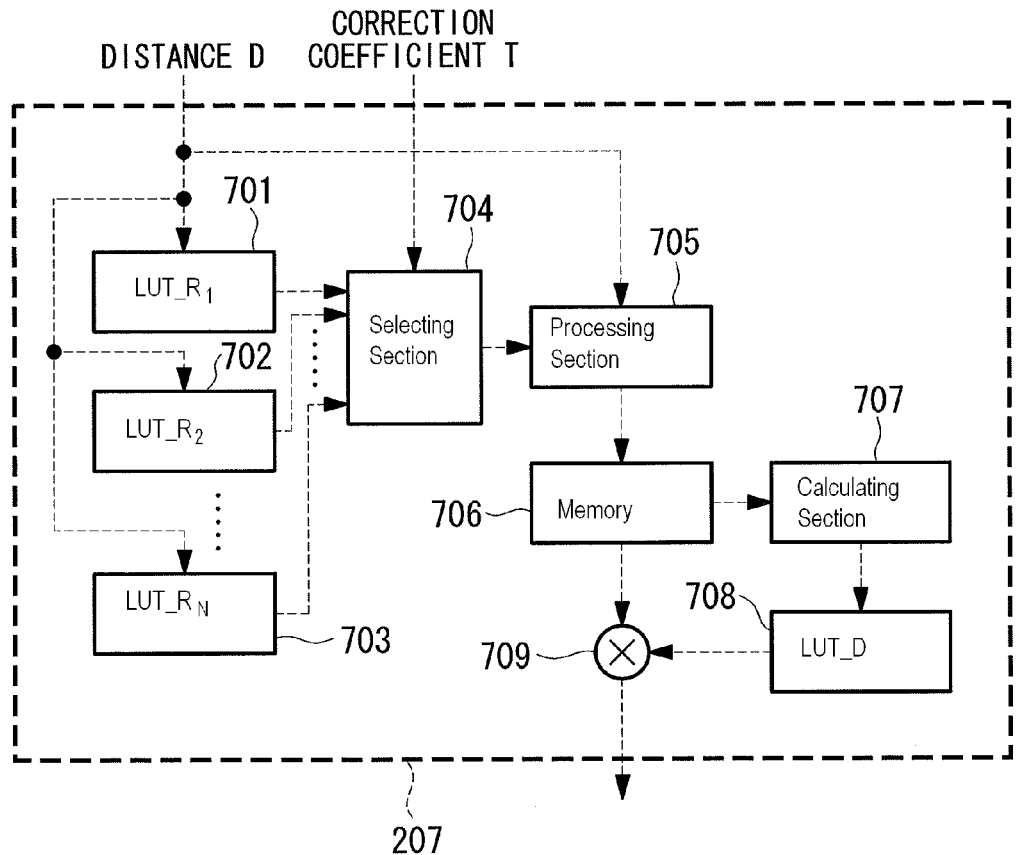
FIG. 7 is a functional block diagram showing a filter-coefficient calculating section shown in FIG. 2.

Next, the filter-coefficient calculating section 207 will be described based on the graph in FIG. 5 and the functional block diagram in FIG. 7.

The distance D output from the distance calculating section 204 is output to $LUT\_R_1$ 701, $LUT\_R_2$ 702, ..., $LUT\_R_N$ 703 and to an interpolation processing section 705.

Figure 5:
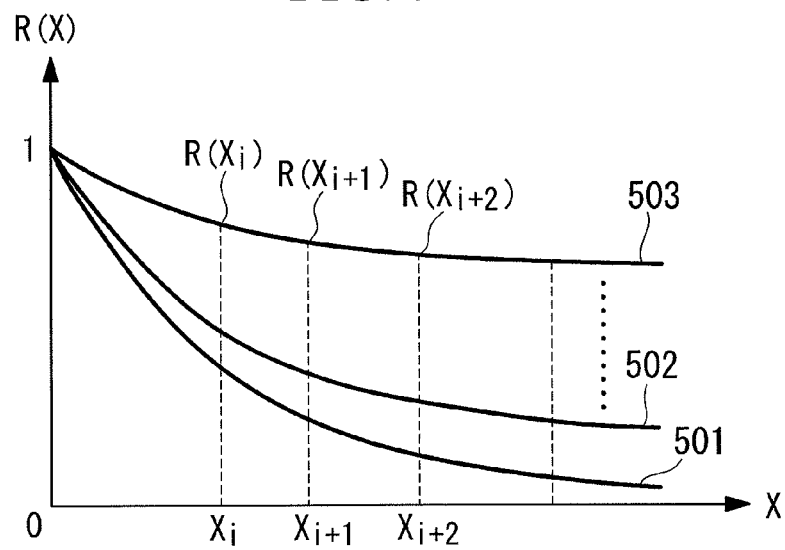
FIG. 5 is a diagram showing a plurality of rational functions modified by the correction coefficient.

The $LUT\_R_1$ 701, $LUT\_R_2$ 702, ..., $LUT\_R_N$ 703 are tables corresponding to graphs 501, 502, and 503 with different T values, for rational functions $\{T/(x+T)\}$ shown in FIG. 5, where T is a value greater than zero.

Thus, a lookup table in which the rational function of graph 501 is associated with $T_1/(x+T_1)$ is defined in $LUT\_R_1$ 701, a lookup table in which the rational function of graph 502 is associated with $T_2/(x+T_2)$ is defined in $LUT\_R_2$ 702, and a lookup table in which the rational function of graph 503 is associated with $T_N/(x+T_N)$ is defined in $LUT\_R_3$ 703. Here, $T_1$, from the correction-coefficient calculating section 206 and are in the relationship $T_1 < T_2 < \ldots < T_N$. In other words, the above rational function is a function that suddenly decreases as the variable x increases, when the correction coefficient is small, and is a function that gradually decreases as the variable x increases, when the correction coefficient is large.

Regarding the distance D output from the distance calculating section 203, an address extracted for a predetermined number of upper bits is input to each lookup table. Then, each lookup table outputs the lookup table value and a gradient stored at that address to a selecting section 704.

$LUT\_R_i$ 701, $LUT\_R_2$ 702, ..., $LUT\_R_N$ 703 are tables in which a gradient $\alpha_j(a)$ of a straight line joining value $R_j(a)$ obtained by sampling the above rational function at variable x=a and $R_j(a+\Delta)$ obtained by sampling it at X=a+$\Delta$ a prescribed distance $\Delta$ away, as well as $R_j(a)$ which is the starting point thereof, are recorded at the location of address a. Here, j=1, 2, ..., N.

In other words, an address for looking up $LUT\_R_1$ 701, $LUT\_R_2$ 702, ..., $LUT\_R_N$ 703 is set on the basis of the distance D, and the starting point $R_j(a)$ and gradient $\alpha_j(a)$ stored at this set address a are output to the selecting section 704.

The selecting section 704 selects one starting point R(a) and gradient $\alpha(a)$ on the basis of these N starting points $R_j(a)$, gradients $\alpha_j(a)$ and correction coefficients $T_i$ and outputs them to the interpolation processing section 705.

The starting point R(a) and gradient $\alpha(a)$ output from the selecting section 704 and a prescribed number of lower bits of the distance D are input to the interpolation processing section 705 to calculate high-precision weighting coefficients $R'(D, T_i)$ for the distance D, which are sequentially stored in a memory 706.

At the instant the weighting coefficients for the three-dimensional block of $N_x \times N_y \times N_t$ pixels are stored in the memory 706, these weighting coefficients are input to a normalization-coefficient calculating section 707. The normalization-coefficient calculating section 707 totals these weighting coefficients and calculates normalization coefficients. The calculated normalization coefficients are converted to reciprocals of the normalization coefficients by LUT_D 708, without dividing the weighting coefficients stored in the memory 706 by the normalization coefficients. Here, the LUT_D 708 is a multiplication/division conversion table prepared in advance for normalization with multiplication.

The reciprocals of the normalization coefficients converted in this way are multiplied, in a multiplier 709, by the weighting coefficients stored in the memory 706, and the results are output to the filter processing section 208 as final filter coefficients C(r, t).

The calculated filter coefficients C(r, t) corresponding to the three-dimensional block of $N_x \times N_y \times N_t$ pixels P(r, t) are weighting coefficients (filter coefficients) that are in inverse proportion to the distance calculated from the inter-pixel-value distance and the temporospatial distance with respect to the processing target pixel $P(r_0, t_0)$, and furthermore, these weighting coefficients have the property that they can be variably controlled according to the above-described correction coefficients, that is, fluctuations in the temporal correlation of the video signal.

In other words, pixels in the $N_x \times N_y \times N_t$ three-dimensional block whose pixel values and temporospatial distances are close to the processing target pixel $P(r_0, t_0)$ (pixels with high correlation) have large weighting coefficients. On the other hand, pixels whose pixel values and temporospatial distances are far away (pixels with low correlation) have small weighting coefficients. Accordingly, regarding the filter processing results of the filter processing section 208, described below, an effect identical to collecting only pixels with high correlation and taking the average thereof is obtained. Therefore, even if a spatial edge and temporal edge (in the case where a scene change or sudden movement occurs) is contained in the block, it is possible to minimize the blunting of edges in the averaging process.

In addition, because the assignment of the weighting coefficients can be variably controlled with the above-described correction coefficients, the noise-reduction effect one frame before is incorporated, and if it does not satisfy the target noise-reduction level, it is possible to apply weighting coefficients that cancel out the correlation levels of the pixel value and distance in the three-dimensional block $N_x \times N_y \times N_t$ so as to achieve the specified noise-reduction level. This is equivalent to selecting more pixels in the three-dimensional block $N_x \times N_y \times N_t$ and performing averaging processing, which can increase the noise-reduction effect. Conversely, if the noise-reduction effect one frame before exceeds the target noise-reduction level, it is possible to apply weighting coefficients that further strengthen the correlation levels of the pixel value and distance in the three-dimensional block $N_x \times N_y \times N_t$ so as to achieve the target noise-reduction level.

Also in a scene change or a scene in which sudden movement occurs, where the temporal correlation suddenly changes, by controlling the correction coefficients so as to cancel out the correlation levels of the pixel value and temporospatial distance between future and current blocks, or past and current blocks, having temporal correlation in the three-dimensional block $N_x \times N_y \times N_t$, it is possible to prevent the noise-reduction level from suddenly deteriorating. Note that a side-effect occurs in that, when control is performed with the correction coefficient in a direction so as to cancel out the correlation levels of the pixel value and temporospatial distance, the resolution decreases. However, because the weighting coefficients can be varied in a substantially continuous manner for the correction coefficients, as in the configuration of this embodiment, it is possible to perform control so that the change in resolution temporally and spatially is gradual, so that the change cannot be visually perceived by the user.

Figure 8:
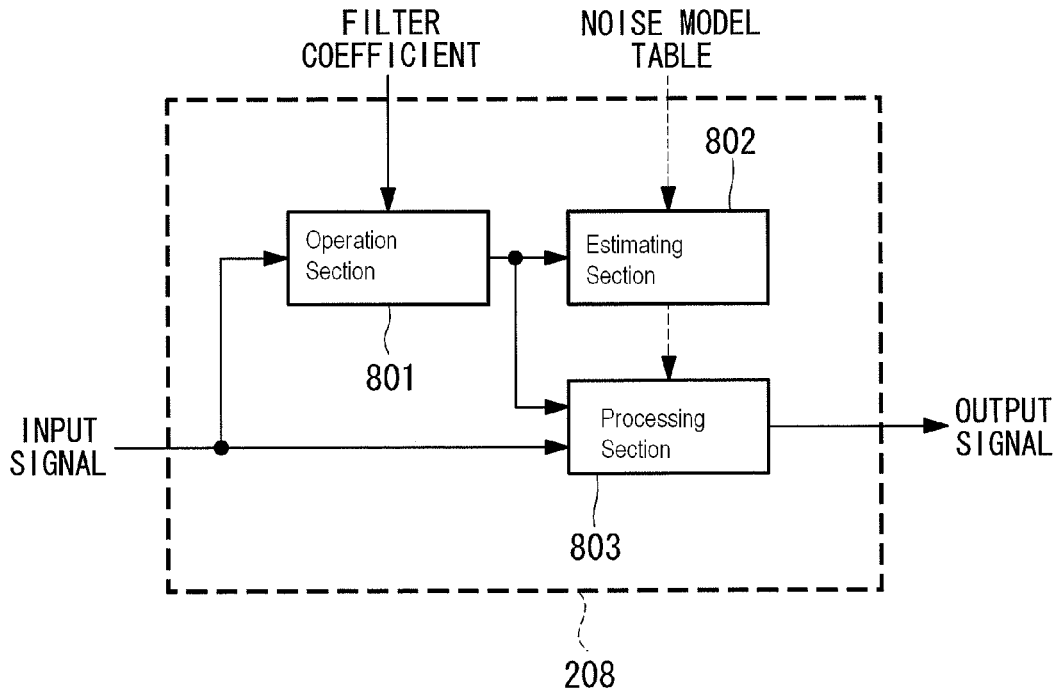
FIG. 8 is a functional block diagram showing a filter processing section shown in FIG. 2.

Next, details of the filter processing section 208 will be described on the basis of the functional block diagram in FIG. 8.

The filter coefficients $C(r, t)$ output from the filter-coefficient calculating section 207, the pixel values $P(r, t)$ stored in the block memories 201, 202, and 203, and a noise model table output from the control section 112 are input to the filter processing section 208.

The filter coefficients $C(r, t)$ and the pixel values $P(r, t)$ are subjected to the following processing in a product-sum operation section 801, and a smoothing-processed pixel value $P'(r_0, t_0)$ at the processing target pixel $P(r_0, t_0)$ is output to a noise-level estimating section 802 and a coring processing section 803.

$$P'(r_0, t_0) = \Sigma_r \Sigma_t C(r,t) P(r,t)$$

At the noise-level estimating section 802, the noise model table output from the control section 112 is stored, and a corresponding noise level $N_{amp}$ obtained with the smoothing-processed pixel value $P'(r_0, t_0)$, which is the output from the product-sum operation section 801, serving as an address is output to the coring processing section 803. Here, the noise model table is a table in which noise levels (levels corresponding to the average noise amplitude) are stored at address positions corresponding to the pixel values, and it can also be a noise model table obtained by arbitrarily modifying a prescribed noise model table in the control section 112 by multiplying it by an arbitrary function, with the pixel value serving as a variable.

The processing target pixel $P(r_0, t_0)$, the pixel value $P'(r_0, t_0)$ after smoothing processing, and the noise level output from the noise-level estimating section 802 are input to the coring processing section 803. The coring processing section 803 performs the following coring decision to calculate the final noise-reduced pixel $P_n(r_0, t_0)$ corresponding to the processing target pixel and outputs it as an output signal:

if $P(r_0,t_0) - P'(r_0,t_0) > N_{amp}$: $P_n(r_0,t_0) = P(r_0,t_0) - N_{amp}$ if $P(r_0,t_0) - P'(r_0,t_0) < N_{amp}$: $P_n(r_0,t_0) = P(r_0,t_0) + N_{amp}$ if $|P(r_0,t_0) - P'(r_0,t_0)| \leq N_{amp}$: $P_n(r_0,t_0) = P'(r_0,t_0)$ Note that, although the filter processing section 208 is assumed to include the noise-level estimating section 802, for example, it may have a more simple configuration including only the product-sum operation section 801, in which case the final noise-reduced pixel $P_n(r_0, t_0)$ is used as $P'(r_0, t_0)$.

With the image processing apparatus according to this embodiment, the spatial correlation within a frame, as well as the temporal correlations between the previous frame and the current frame and between the current frame and the future frame, are used to perform noise-reduction processing of a video signal. Accordingly, even when, for example, a scene change occurs, it is possible to suppress an effect whereby the noise-reduction level is sensitive to fluctuations in the temporal correlation, which enables stable noise reduction while inhibiting a drop in resolution.

Also, because pixels obtained after performing noise-reduction on pixels in the previous frame and the current frame, which are used in recursive noise-reduction processing, are used, the noise-reduction level can be improved.

Because the weighting coefficients are calculated using the temporospatial distance and the inter-pixel-value distance, and weighted averaging is performed by weighting pixels having a high correlation with the noise processing target pixel, it is possible to perform effective noise reduction while minimizing the blunting of spatial edges or sudden scene changes in time.

In addition, the noise level of the target pixel is estimated on the basis of a value obtained by taking the product-sum operation of the weighting coefficients and the pixel values of a plurality of pixels in a prescribed region, and the noise-reduction processing is performed on the basis of this noise level; by doing so, it is possible to perform effective noise reduction that is adapted to the noise characteristics of the input signal, and it is also possible to minimize resolution degradation (blunting) at edge portions.

By correcting the weighting coefficients on the basis of the noise-reduction level of the target pixel, it is possible to suppress an effect whereby the noise-reduction level is sensitive to fluctuations in the temporal correlations which occur when noise reducing a video signal, which enables stable noise reduction with small temporal fluctuations while inhibiting a drop in resolution.

By correcting the weighting coefficients on the basis of the pixel value of the target pixel, it is possible to control the noise-reduction level over a wide range according to the pixel value in the current frame.

In addition, by correcting the weighting coefficients on the basis of the inter-frame correlation level between the processing target frame image and previous and future frame images, it is possible to suppress an effect whereby the noise-reduction level is sensitive to temporal fluctuations which occur when noise reducing a video signal, which enables stable noise reduction with small temporal fluctuations.

In the embodiment described above, it is assumed that the processing is implemented by hardware; however, it is not necessarily limited to such a configuration. For example, a configuration in which the processing is preformed in separate software is also possible. In this case, the image processing apparatus includes a CPU, a main storage device such as a RAM, and a computer-readable recording medium in which a program for implementing all or part of the above processing is recorded. Then, the CPU reads out the program recorded in the recording medium and executes information processing and computational processing, thereby realizing the same processing as the above-described image processing apparatus. Computer-readable recording medium here means a magnetic disk, a magneto-optical disk, a CD-ROM, a DVD-ROM, a semiconductor memory or the like.

Figure 11A:
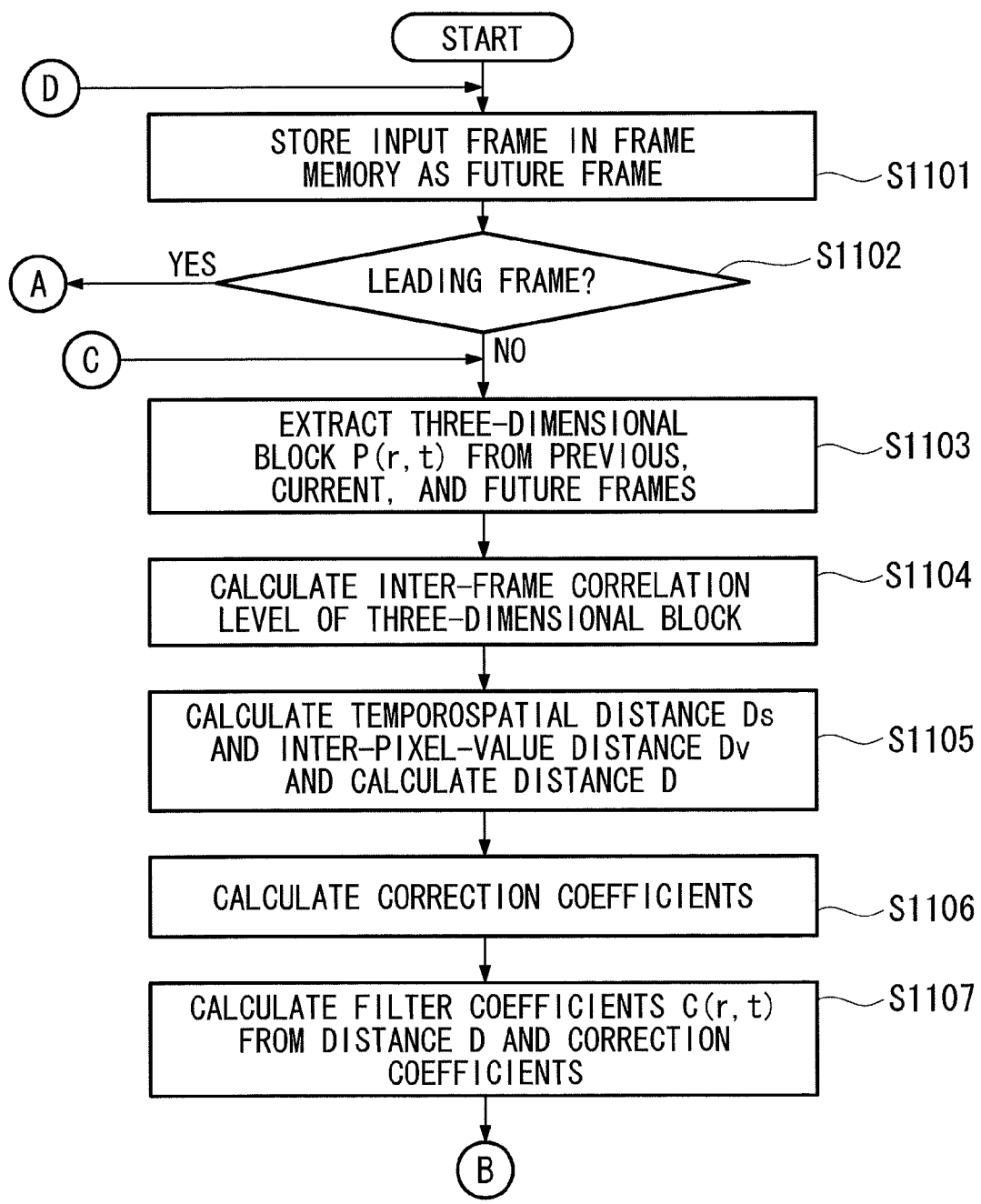
FIG. 11A is a flowchart showing the processing sequence in the first embodiment.
Figure 11B:
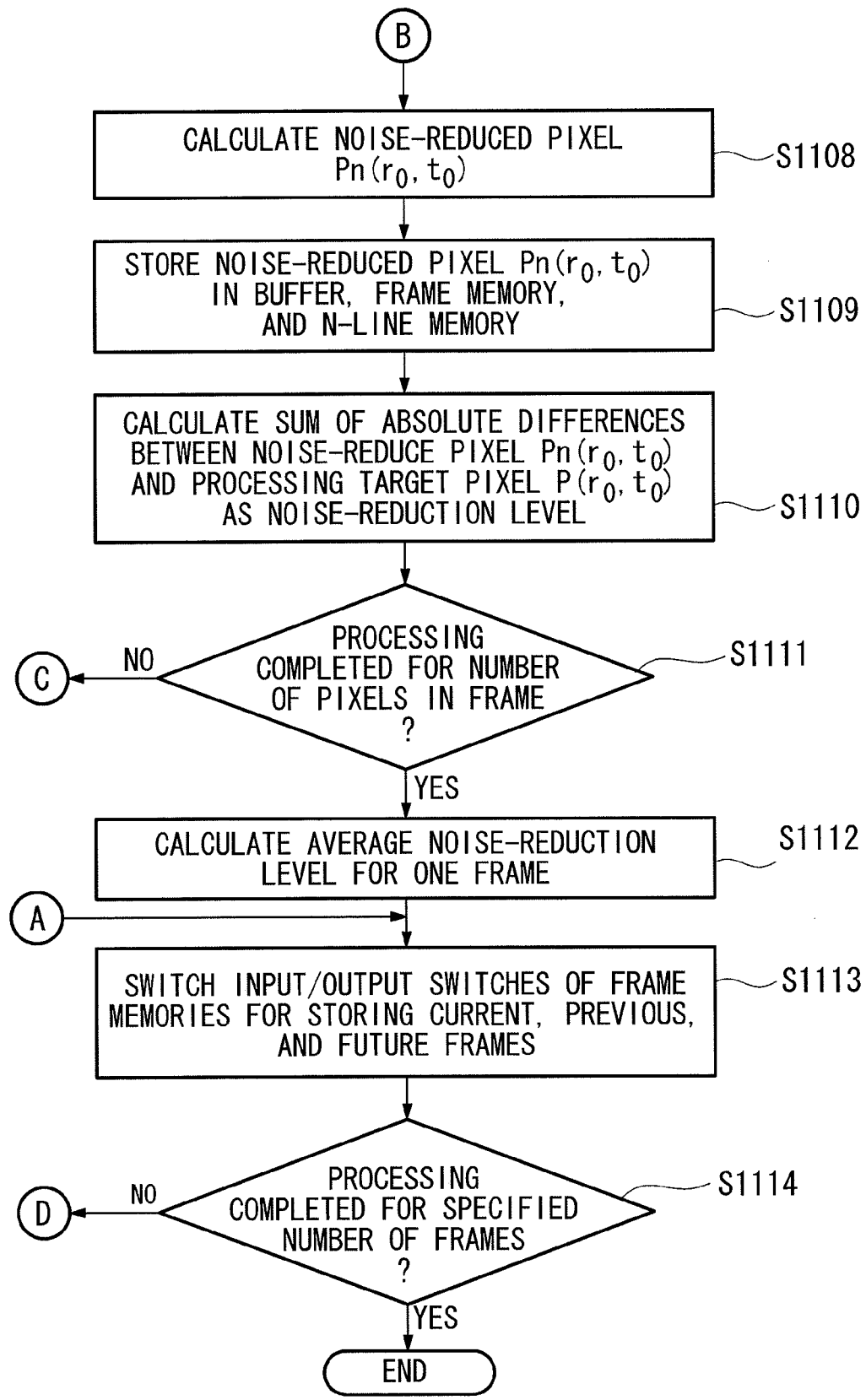
FIG. 11B is a flowchart showing the processing sequence in the first embodiment.

The flowcharts in FIG. 11A and FIG. 11B show the processing sequence in the first embodiment.

First, the input video signal is stored as a future frame in the frame memory 102 or 103 via the switch 101 (S1101).

Next, it is determined whether the input video signal is the leading frame (S1102), and if it is the leading frame, the process proceeds to S1113. If it is not the leading frame, the three-dimensional block P(r, t) is extracted from the previous, future and current frames stored in the frame memory 102 or 103 and the frame memory 109 or 110 and then the N-line memory 106 and is stored in the block memories 201, 202, and 203 as the previous block 301, the future block 303, and the current block 302, respectively (S1103).

Next, for the three-dimensional block stored in the block memories 201, 202, and 203, the inter-frame correlation levels $S_p$ and $S_f$ are calculated (S1104), and the temporospatial distances Ds and inter-pixel-value distances Dv between the noise processing target pixel $P(r_0, t_0)$ in the three-dimensional block and the surrounding pixels are calculated, and these two distances are multiplied to calculate the distance D (S1105).

Next, correction coefficients $T_p$, $T_c$, and $T_f$ for the three blocks are calculated from the frame-average noise-reduction level $NR_{ave}$ one frame before, the target noise-reduction level $NR_{target}$ the pixel values $P(r, t_0)$ in the current block, and the inter-frame correlation levels $S_p$ and $S_f$ (S1106), and filter coefficients C(r, t) are calculated using the distance D and the correction coefficients $T_p$, $T_c$, and $T_f$ (S1107).

Next, the noise-reduced pixel $P_n(r_0, t_0)$ is calculated on the basis of the calculated filter coefficients C(r, t) and the three-dimensional block of pixels P(r, t) (S1108), and the noise-reduced pixel $P_n(r_0, t_0)$ is stored in an output buffer (not illustrated), the frame memory 109 or 110, and the N-line memory 106 (S1109).

Next, the noise-reduction level is calculated using the sum of absolute differences between the noise-reduced pixel $P_n(r_0, t_0)$ and the processing target pixel $P(r_0, t_0)$ (S1110), and it is determined whether the calculation of the noise-reduced pixels has been completed for the number of pixels in the frame (S1111). If, as a result of this determination, processing has not yet been completed for the number of pixels in the frame, the process returns to S1103, and the noise-reduction processing is repeated for the next processing target pixel. If the processing has been completed for the number of pixels in the frame, the average value of the calculated noise-reduction levels is obtained to calculate the frame-average noise-reduction level $NR_{ave}$ (S1112). Then, the inputs and outputs of the switches 101, 104, 105, 108, and 111 that perform input/output control of the frame memories that store the current, previous, and future frames are switched (S1113).

Finally, it is determined whether the processing has been completed for the specified number of frames to be processed (S1114); if processing has not been completed, the process returns to S1101 where processing is repeated for the next frame, and once it is determined that processing has been completed for the specified number of frames, the noise reduction processing ends.

In the above-described embodiment, the weighting coefficients are calculated with the distance D, which is the product of the inter-pixel-value distance Dv and the temporospatial distance Ds, serving as the variable in one rational function; however, the weighting coefficients may be calculated with function values R(Dv) and R(Ds) after supplying the inter-pixel-value distance $D_v$ and the temporospatial distance $D_s$ to respective functions.

Furthermore, the function for converting the distance D to a weighting coefficient is not only a rational function; for example, a Gaussian function $Exp(-x^2/2\sigma^2)$ may be used. In this case, the same effect can be obtained by taking the distance D as x, and the correction coefficient T as σ. Also, as σ is increased, the width of the Gaussian function increases, which has the effect of canceling out the distance correlation. Conversely, as σ is decreased, the width of the Gaussian function decreases, making it possible to further emphasize the distance correlation.

Second Embodiment

Next, a second embodiment of the present invention will be described using FIG. 9.

The image processing apparatus according to this embodiment differs from that in the first embodiment in the provision of a motion compensation section 901 instead of the block-extracting section 114. In the image processing apparatus according to this embodiment, a description of commonalities with the first embodiment will be omitted, and mainly the differences will be described.

Figure 9:
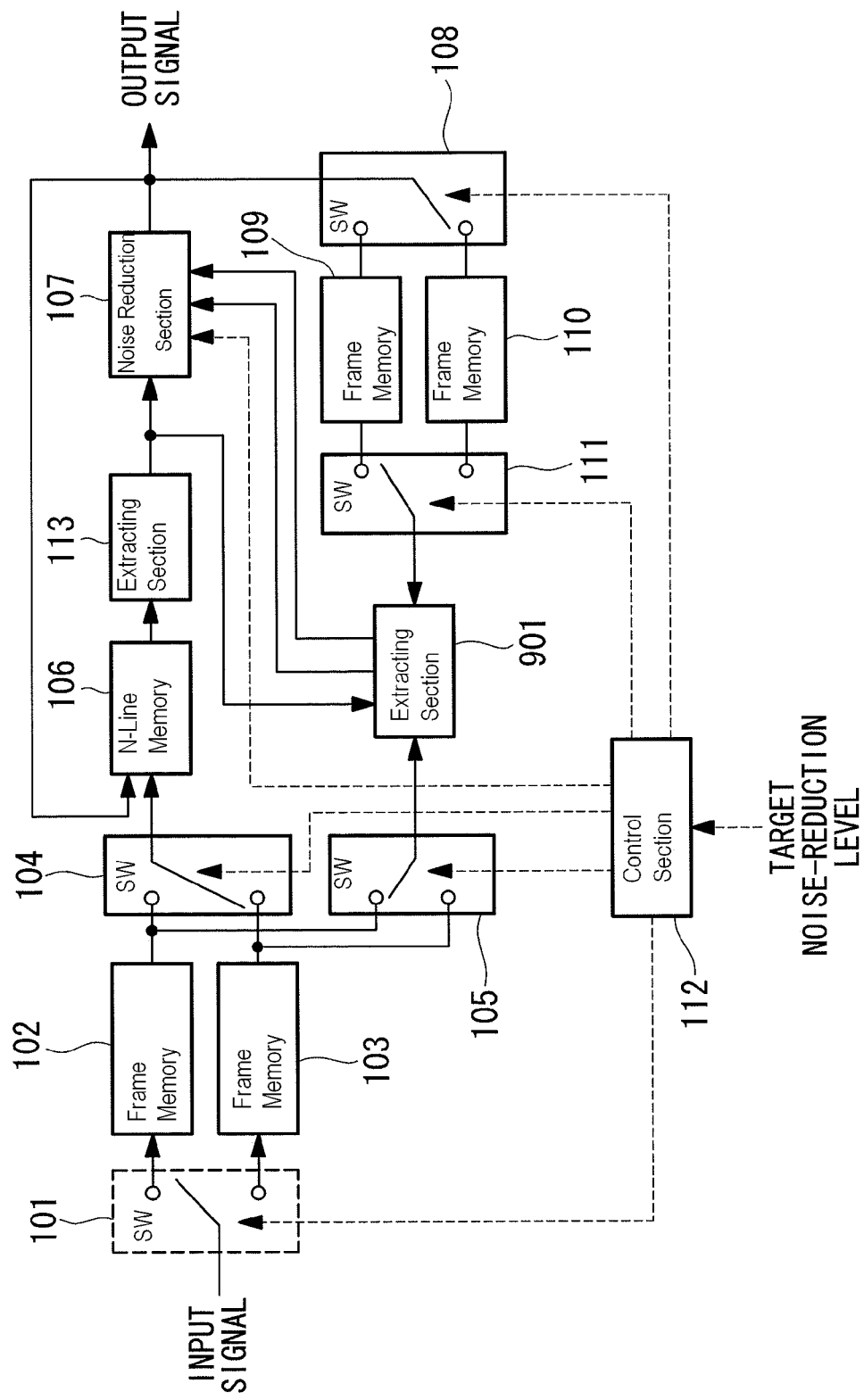
FIG. 9 is a functional block diagram showing, in expanded fashion, the functions provided in an image processing apparatus according to a second embodiment of the present invention.

FIG. 9 is a functional block diagram showing the basic configuration of the second embodiment of the present invention.

A video signal in the form of digital data captured at an image-capturing device in an image-capturing unit (not illustrated) is input to the switch 101, is alternately connected to the frame memory 102 or the frame memory 103 every frame period by means of a control signal from the control section 112, and is stored in the frame memory 102 or the frame memory 103 every frame period.

The outputs of the frame memory 102 and the frame memory 103 are connected to the inputs of the switch 104 and the switch 105 and are then connected to the N-line memory 106 and the motion compensation section 901 by means of control signals from the control section 112. When the frame memory 102 is connected to the N-line memory 106 via the switch 104, the frame memory 103 is connected to the motion compensation section 901 via the switch 105. On the other hand, control is performed by the control section 112 so that, when the frame memory is connected to the motion compensation section 901 via the switch 105, the frame memory 103 is connected to the N-line memory 106 via the switch 104.

Pixels in a prescribed number of lines above and below the target pixel to be subjected to noise-reduction processing are temporarily stored in the N-line memory 106 from the frame memory 102 or the frame memory 103.

The output of the N-line memory 106 is connected to the input of the noise-reduction section 107 and the motion compensation section 901 via the block-extracting section 113.

The noise reduction section 107 is connected so that the output of the block-extracting section 113, the outputs from the motion compensation section 901, and a control signal from the control section 112 are input thereto. The noise reduction section 107 performs noise-reduction processing on the processing target pixel on the basis of a prescribed pixel region in a processing target frame, which is output from the block-extracting section 113; prescribed pixel regions in temporally prior and subsequent frame images which have been subjected to motion compensation in the motion compensation section 901; and a control signal from the control section 112. The noise-reduced pixels calculated in this way are output to a buffer memory in an image processing unit connected at a subsequent stage (not illustrated), as the output signal.

The output of the noise reduction section 107 is also connected to the inputs of the switch 108 and the N-line memory 106. The output signal from the noise-reduction section 107 is used to overwrite the processing target pixels before noise reduction, which are stored in the N-frame memory 106, with noise-reduced pixels. Accordingly, it becomes possible to form a recursive filter that uses noise-reduced pixels even in the current frame, thus making it possible to reduce noise even more effectively.

Regarding the output of the switch 108, the connection is switched to either the frame memory 109 or the frame memory 110 every frame period, with a control signal from the control section 112, so that the noise-reduced pixels from the noise reduction section 107 are recorded in the corresponding frame memory 109 or frame memory 110.

The frame memory 109 or the frame memory 110 is connected to the motion compensation section 901 via the switch 111, in a switching manner every frame period, with a control signal from the control section 112. When the output of the switch 108 is connected to the frame memory 109, the frame memory 110 is connected to the switch 111. On the other hand, the control section 112 performs control so that, when the output of the switch 108 is connected to the frame memory 110, the frame memory 109 is connected to the switch 111.

The current block 302 from the connected block-extracted section 113 is input to the motion compensation section 901, and the future and previous frames, which come temporally before and after relative to the processing target frame, are input to the motion compensation section 901 via the switches 104, 105, and 111. The motion compensation section 901 calculates the position at which the correlation values of the future and previous frames with respect to the current block 302 are maximum. Then, the regions with the highest correlation are extracted from the future and previous frames and are output to the noise reduction section 107 as the future block 303 and the previous block 301.

The control section 112 outputs a target noise-reduction level that is set in advance to the noise reduction section 107 and outputs the control signals for interlocked control of the switches 101, 104, 105, 108, and 111, as described above.

Figure 10:
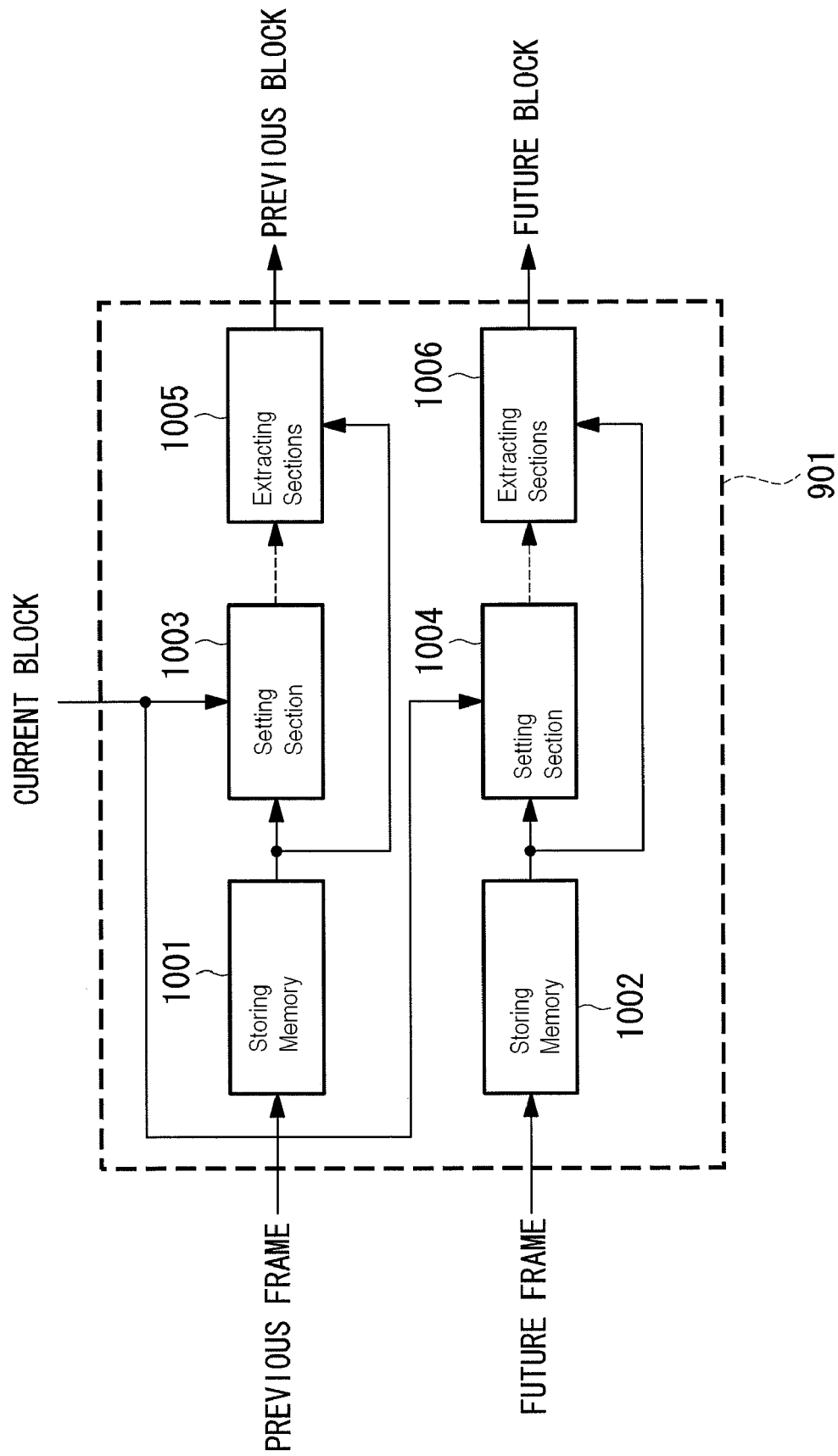
FIG. 10 is a functional block diagram showing a motion compensation section shown in FIG. 9.

Details of the motion compensation section 901 will be described below based on FIG. 10.

An extracted image in a prescribed search range of the previous frame input to the motion compensation section 901 is stored in a search-range storing memory 1001. In addition, an extracted image in a prescribed search range of the future frame is stored in a search-range storing memory 1002.

On the other hand, the current block is input to a motion-vector setting section (motion-vector detecting section) 1003 and a motion-vector setting section (motion-vector detecting section) 1004. The extracted image in the motion-vector search range (a region larger than the size $N_x \times N_y$ of the current block) in the previous frame is input from the search-range storing memory 1001 to the motion-vector setting section 1003. Also, the extracted image in the motion-vector search range (a region larger than the size $N_x \times N_y$ of the current block) in the future frame is input from the search-range storing memory 1002 to the motion-vector setting section 1004.

The motion-vector setting sections 1003 and 1004 perform pattern matching in the extracted images in the search range, with the current block serving as a pattern matching reference image, while moving by the pixel pitch, and the position of maximum correlation in the search range is set as the motion vector. As an example of the pattern matching processing, it is possible to use a well-known method in which the position where the sum of squares or absolute differences is minimized is taken as the correlation maximum.

The motion vectors set in the motion-vector setting sections 1003 and 1004 are respectively input to block-extracting sections 1005 and 1006.

The extracted image in the previous frame stored in the search-range storing memory 1001 is input to the block-extracting section 1005, and the block-extracting section 1005 extracts the previous block on the basis of the set motion vector for the previous frame and outputs it to the noise-reduction section 107.

The extracted image in the future frame stored in the search-range storing memory 1002 is input to the block-extracting section 1006, and the block-extracting section 1006 extracts the future block on the basis of the set motion vector for the future frame and outputs it to the noise-reduction section 107.

As described above, according to this embodiment, because the future block and the previous block are selected using motion compensation relative to the current block, it is possible to form a three-dimensional block with higher correlation than in the first embodiment. Accordingly, the weighting coefficients for the future block and the previous block, which are calculated in the filter-coefficient calculating section 207, become larger, which increases their contributions to the weighted average. As a result, an effect whereby the noise-reduction level is sensitive to fluctuations in the temporal correlations, which occur when reducing the noise in a video signal with recursive noise-reduction processing, can be suppressed, which makes it possible to perform more stable noise reduction. Furthermore, it is possible to automatically adapt the target noise-reduction level according to the input video signal, and thus an advantage is afforded in that the system can adapt instantaneously even when the gain of the image-capturing device changes.

Each of the above embodiments has been described in terms of a recursive type (IIR type) in which all pixels in the previous block and some of the pixels in the current block are replaced with pixel values subjected to noise-reduction processing; however, a feed-forward type (FIR type) configuration is also possible. In this case, although the noise-reduction level in stationary regions is lower than with the recursive type, the convergence properties for inhibiting afterimages which occur in moving regions is improved. In addition, although a progressive-scan signal is assumed as the input signal in the above-described first embodiment and second embodiment, a field-interlaced signal may be used. In this case, each of the embodiments described above is configured by replacing frame image with field image in the description.

What is claimed is:

1. An image processing apparatus for noise reduction processing of frame images or field images that are input time-sequentially, comprising
    a recording unit configured to record a processing target frame image or field image and previous and future frame images or field images relative to the processing target frame image or field image;
    a first pixel-extracting section configured to extract a plurality of pixels in a prescribed region in the processing target frame image or field image recorded by the recording unit;
    a second pixel-extracting section configured to extract a plurality of pixels in a region corresponding to the prescribed region in the previous frame image or field image and in the future frame image or field image recorded by the recording unit;
    a first distance calculating section configured to calculate temporospatial distances between a target pixel in the prescribed region extracted at the first pixel-extracting section and both the plurality of pixels in the prescribed region and the plurality of pixels in the region corresponding to the prescribed region, extracted at the second pixel-extracting section;
    a second distance calculating section configured to calculate inter-pixel-value distances between the pixel value of the target pixel in the prescribed region extracted at the first pixel-extracting section and both pixel values of the plurality of pixels in the prescribed region extracted at the first pixel-extracting section and pixel values of the plurality of pixels in the region corresponding to the prescribed region, extracted at the second pixel-extracting section; and
    a noise reduction section configured to perform noise reduction processing of the processing target frame image or field image on the basis of the temporospatial distance calculated by the first distance calculating section and the inter-pixel-value distance calculated by the second distance calculating section.

2. An image processing apparatus according to claim 1, wherein
    the recording unit includes an overwriting section configured to overwrite the recorded processing target frame image or field image and the previous frame image or field image with an image subjected to noise-reduction processing;
    the first pixel-extracting section is configured to extract pixels subjected to noise-reduction processing for some of the pixels of the processing target frame image or field image; and
    the second pixel-extracting section is configured to extract pixels subjected to noise-reduction processing for all of the pixels in the previous frame image or field image.

3. An image processing apparatus according to claim 1, wherein the noise reduction section comprises:
    a weighting-coefficient calculating section configured to calculate weighting coefficients for the plurality of pixels in the prescribed region on the basis of the temporospatial distance calculated by the first distance calculating section and the inter-pixel-value distance calculated by the second distance calculating section; and
    a weighted-average calculating section configured to calculate a weighted average of the target pixel and the plurality of pixels in the prescribed region on the basis of the weighting coefficients calculated by the weighting-coefficient calculating section.

4. An image processing apparatus according to claim 1, wherein the noise reduction section
    includes a noise-level estimating section configured to estimate a noise level of the target pixel; and
    performs noise-reduction processing on the target pixel on the basis of the noise level estimated by the noise-level estimating section.

5. An image processing apparatus according to claim 4 wherein
    the noise reduction section includes a product-sum operation section configured to perform a product-sum operation on the pixel values of the plurality of pixels in the prescribed region and the weighting coefficients calculated by the weighting-coefficient calculating section; and
    the noise-level estimating section is configured to estimate the noise level on the basis of a product-sum operation value calculated by the product-sum operation section.

6. An image processing apparatus according to claim 3, wherein the noise reduction section comprises:
    a noise-reduction-level calculating section configured to calculate a noise-reduction level on the basis of the pixel values before and after noise-reduction processing of the target pixel; and
    a correction-coefficient calculating section configured to calculate correction coefficient on the basis of the noise-reduction level calculated by the noise-reduction level calculating section,
    and is configured to correct the weighting coefficients on the basis of the correction coefficients calculated by the correction-coefficient calculating section.

7. An image processing apparatus according to claim 4, wherein the noise-reduction section comprises:
    a noise-reduction-level calculating section configured to calculate a noise-reduction level on the basis of the pixel values before and after noise-reduction processing of the target pixel; and
    a correction-coefficient calculating section configured to calculate correction coefficients on the basis of the noise-reduction level calculated by the noise-reduction level calculating section,
    and is configured to correct the weighting coefficients on the basis of the correction coefficients calculated by the correction-coefficient calculating section.

8. An image processing apparatus according to claim 3 wherein the noise reduction section
    includes a correction-coefficient calculating section configured to calculate correction coefficients on the basis of the pixel value of the target pixel extracted at the first pixel-extracting section; and
    corrects the weighting coefficients on the basis of the correction coefficients calculated by the correction-coefficient calculating section.

9. An image processing apparatus according to claim 4 wherein the noise reduction section
    includes a correction-coefficient calculating section configured to calculate correction coefficients on the basis of the pixel value of the target pixel extracted at the first pixel-extracting section; and corrects the weighting coefficients on the basis of the correction coefficients calculated by the correction-coefficient calculating section.

10. An image processing apparatus according to claim 3 wherein the noise reduction section comprises an inter-frame correlation-level calculating section configured to calculate an inter-frame correlation level on the basis of the plurality of pixels in the prescribed region of the processing target frame image or field image and the plurality of pixels in the prescribed region of the previous and future frame images or field images; and a correction-coefficient calculating section configured to calculate correction coefficients on the basis of the inter-frame correlation level calculated by the inter-frame correlation-level calculating section, and is configured to correct the weighting coefficients on the basis of the correction coefficients calculated by the correction-coefficient calculating section.

11. An image processing apparatus according to claim 4 wherein the noise reduction section comprises an inter-frame correlation-level calculating section configured to calculate an inter-frame correlation level on the basis of the plurality of pixels in the prescribed region of the processing target frame image or field image and the plurality of pixels in the prescribed region of the previous and future frame images or field images; and a correction-coefficient calculating section configured to calculate correction coefficients on the basis of the inter-frame correlation level calculated by the inter-frame correlation-level calculating section, and is configured to correct the weighting coefficients on the basis of the correction coefficients calculated by the correction-coefficient calculating section.

12. An image processing apparatus according to claim 1, wherein the second pixel-extracting section includes a motion-vector detecting section configured to detect respective motion vectors on the basis of the correlation level between the processing target frame image or field image and the previous and future frame images or field images; and is configured to extract the plurality of pixels in the prescribed region from the previous and future frame images or field image recorded in the recording unit on the basis of the motion vectors detected by the motion-vector detecting section.

13. A computer readable recording device in which is recorded an image-processing program causing a computer to execute noise reduction processing of frame images or field images that are input time-sequentially, the program causing a computer to execute:

recording processing for recording a processing target frame image or field image and previous and future frame images or field images relative to the processing target frame image or field image;

first pixel-extraction processing for extracting a plurality of pixels in a prescribed region in the processing target frame image or field image recorded in the recording processing;

second pixel-extraction processing for extracting a plurality of pixels in a region corresponding to the prescribed region in the previous frame image or field image and in the future frame image or field image recorded in the recording processing;

first distance calculating processing for calculating temporospatial distances between a target pixel in the prescribed region extracted in the first pixel-extraction processing and both the plurality of pixels in the prescribed region and the plurality of pixels in the region corresponding to the prescribed region, extracted in the second pixel-extraction processing;

second distance calculating processing for calculating inter-pixel-value distances between the pixel value of the target pixel in the prescribed region extracted in the first pixel-extraction processing and both pixel values of the plurality of pixels in the prescribed region extracted in the first pixel-extraction processing and pixel values of the plurality of pixels in the region corresponding to the prescribed region, extracted in the second pixel-extraction processing; and noise reduction processing for performing noise reduction processing of the processing target frame image or field image on the basis of the temporospatial distance calculated by the first distance calculating processing and the inter-pixel-value distance calculated by the second distance calculating processing.

14. An image processing method for noise reduction processing of frame images or field images that are input time-sequentially, the image processing method comprising:

a recording step of recording a processing target frame image or field image and previous and future frame images or field images relative to the processing target frame image or field image;

a first pixel-extraction step of extracting a plurality of pixels in a prescribed region in the processing target frame image or field image recorded in the recording step;

a second pixel-extraction step of extracting a plurality of pixels in a region corresponding to the prescribed region in the previous frame image or field image and in the future frame image or field image recorded in the recording processing;

a first distance calculating step of calculating temporospatial distances between a target pixel in the prescribed region extracted in the first pixel-extraction step and both the plurality of pixels in the prescribed region and the plurality of pixels in the region corresponding to the prescribed region, extracted in the second pixel-extraction step;

a second distance calculating step of calculating inter-pixel-value distances between the pixel value of the target pixel in the prescribed region extracted in the first pixel-extraction step and both pixel values of the plurality of pixels in the prescribed region extracted in the first pixel-extraction step and pixel values of the plurality of pixels in the region corresponding to the prescribed region, extracted in the second pixel-extraction step; and a noise reduction step of performing noise reduction processing of the processing target frame image or field image on the basis of the temporospatial distance calculated in the first distance calculating step and the inter-pixel-value distance calculated in the second distance calculating step.

* * * * *